H. B. ROSS.
CUTTER HEAD SECURING DEVICE.
APPLICATION FILED JAN. 16, 1911.
1,004,203.
Patented Sept. 26, 1911.
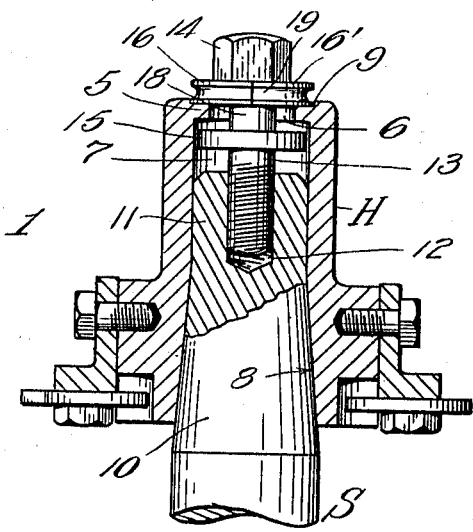
Fig. 1
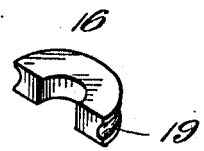
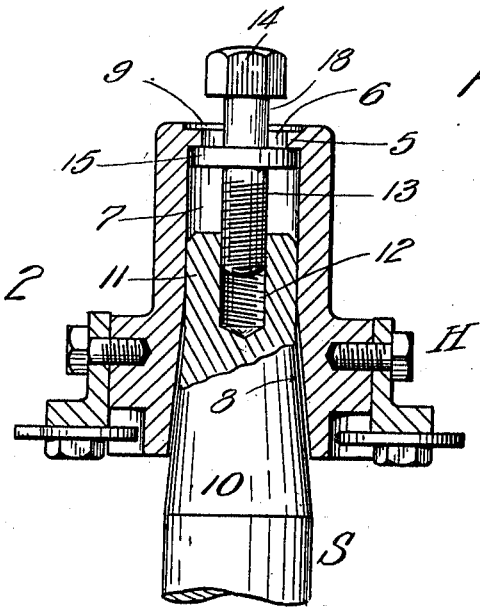
Fig. 2
Fig. 3
WITNESSES:
L. W. Zeebaugh
H. Barnes,
INVENTOR:
Harry B. Ross
BY
Pierre Barnes
ATTORNEY

UNITED STATES PATENT OFFICE.

HARRY B. ROSS, OF SEATTLE, WASHINGTON.

CUTTER-HEAD-SECURING DEVICE.

1,004,203. Specification of Letters Patent. Patented Sept. 26, 1911.

Application filed January 16, 1911. Serial No. 602,817.

*To all whom it may concern:*

Be it known that I, HARRY B. ROSS, a citizen of the United States, residing at Seattle, in the county of King and State of Washington, have invented certain new and useful Improvements in Cutter-Head-Securing Devices, of which the following is a specification.

This invention relates to devices for coupling the cutter-heads of planing machines to the spindles therefor.

There has hitherto been a demand for a better way of securing a cutter-head on its spindle than is afforded by means of a set screw which acts, when there is the least looseness between the head and the spindle, to displace the head eccentrically, with the result that the bits carried by the head will cut untrue.

The object of my invention is to provide an improved method of and conveniently applied means for securing a cutter head to its spindle or for removing the same therefrom, and which will serve to maintain the head in concentric relation to the spindle.

The invention consists in the novel construction and adaptation of devices, as will be hereinafter described and claimed.

In the accompanying drawings, Figure 1 is a view in longitudinal section of a cutter-head shown operatively connected to a spindle by means of coupling devices embodying my invention. Fig. 2 is a view similar to Fig. 1, but with the cutter-head illustrated in disengaged condition for withdrawal from the spindle. Fig. 3 is a perspective view of one of the washer-segments such as shown in Fig. 1.

The reference character H represents a cutter-head formed with a body provided with a socket extending from its underside to a top wall 5 which is axially bored as at 6. Adjacent to said wall the socket is cylindrical, as at 7, and therebelow the socket is formed with a mouth having a tapering peripheral wall 8. In the upper side of the wall 5 is a recess 9.

S represents a spindle formed with a tapering portion 10 serving as a seat for the correspondingly-shaped wall 8 of the head, and is further provided with a cylindrical extremity 11 which fits within the socket part 7. Extending axially into the end of said spindle is a screw-threaded hole 12 for the threaded end of a bolt 13. Formed upon this bolt is a head 14 of less width than the diameter of the opening 6 in the head. Also formed on the bolt is a collar 15 adapted to be introduced from below into the socket part 7, but of a diameter greater than that of said opening.

16 and 16' represent complementary halves of a divided washer arranged to be inserted within the recess 9 so as to embrace the neck 18 of the bolt. To facilitate the removal of the washer, it is desirably formed with a circumferential groove 19.

The operation of the invention is as follows: The aforedescribed parts are assembled by first screwing the bolt 13 into the hole 12 of the spindle, the head is then placed over the head of the bolt and seated upon the collar 15; whereupon the divided washer 16—16' is placed in the recess 9 so that the bolt, when further screwed into the spindle, will engage the washer to thereby draw the cutter-head onto the tapered portion 10 of the spindle. To remove the cutter-head, the bolt is retracted to allow the removal of the divided washer and then, by the further unscrewing of the bolt, the collar 15 of the latter is brought against the peripheral shoulder afforded by the underside of the end wall 5 to finally withdraw the cutter-head from its seat upon the tapered part of the spindle. The operator can now remove the cutter-head by lifting the same from the bolt, whose head passes freely through the opening 6 and without disturbing the bolt.

What I claim, is—

1. In combination with a cutter-head provided with a tapering bore and having an opening in the outer end thereof, and a spindle having a portion tapering in a direction away from the body of the spindle and within the cutter head bore, of means extending through said opening and engaging with the spindle whereby the cutter-head may be caused to seat against the tapering portion of the spindle or withdrawn therefrom for the removal of the cutter-head.

2. In combination with a cutter-head provided with a tapering socket, and a spindle therefor having a tapering portion to serve as a seat for the cutter-head, a headed screw bolt extending through an opening in the end of the cutter-head and engaging in a threaded hole in the spindle, a collar integral with said bolt and arranged to be operable within the cutter head, and a divided washer adapted to be seated against the outer end of the cutter-head and furnish a seat for the bolt head.

3. In combination with a spindle provided with a tapering portion and having a screw threaded hole extending into the end thereof, and a body having a tapering socket and provided with a recess in its outer end, of a screw bolt engaging the spindle in the hole thereof and extending through an opening at the outer end of said body to terminate exteriorly of the latter in a head which is of less width than the diameter of said opening, a collar of greater diameter than said opening integral with said bolt and positioned within the body-socket, and a divided washer arranged to seat within said recess and embrace the bolt below the head thereof.

4. In combination, a body having a socket and an opening in the end of the body of less diameter than that of the smaller end of the socket, a spindle extending into said socket, a headed screw-bolt extending through the opening in said body and engaging in a threaded hole provided in the spindle, a collar integral with said bolt and arranged to engage the body at a shoulder at the end of the socket, and a divided washer seated upon the body intermediate the latter and the bolt head, said collar and nut being rendered operative to respectively move the body in opposite directions when the screw is manipulated to cause it to be screwed in or out relatively to the spindle.

5. In combination with a spindle provided with an opening having a threaded wall, a body provided with a socket to receive the spindle and having an opening in the end of the body of less diameter than the socket, of means including a screw extending through said opening and engaging the spindle when the screw is revolved in one direction whereby the body may be moved outwardly with respect to the spindle, and means carried by the screw and co-operating with the aforesaid means whereby the body may be moved in the opposite direction.

6. In combination, a cutter head having an opening at one end and further provided with a bore which communicates with said opening, that end of the bore opposite that end which communicates with the opening being tapered, a spindle having a reduced end, a portion of said reduced end being tapered, said reduced end of said spindle adapted to fit in said bore, rotatable means extending through said opening and engaging in the spindle and adapted when rotated in one direction to cause the tapered portion of the bore of the cutter head to seat against the tapered portion of the reduced end of the spindle, and means associated with said rotatable means and adapted when the latter is revolved in the opposite direction for withdrawing the tapered portion of the bore away from the tapered portion of the reduced end of the spindle.

HARRY B. ROSS.

Witnesses:
  H. Barnes,
  E. Peterson.

---

Copies of this patent may be obtained for five cents each, by addressing the "Commissioner of Patents, Washington, D. C."